No. 840,146. PATENTED JAN. 1, 1907.
S. D. MADDIN.
VEHICLE.
APPLICATION FILED MAY 10, 1905.
2 SHEETS—SHEET 1.
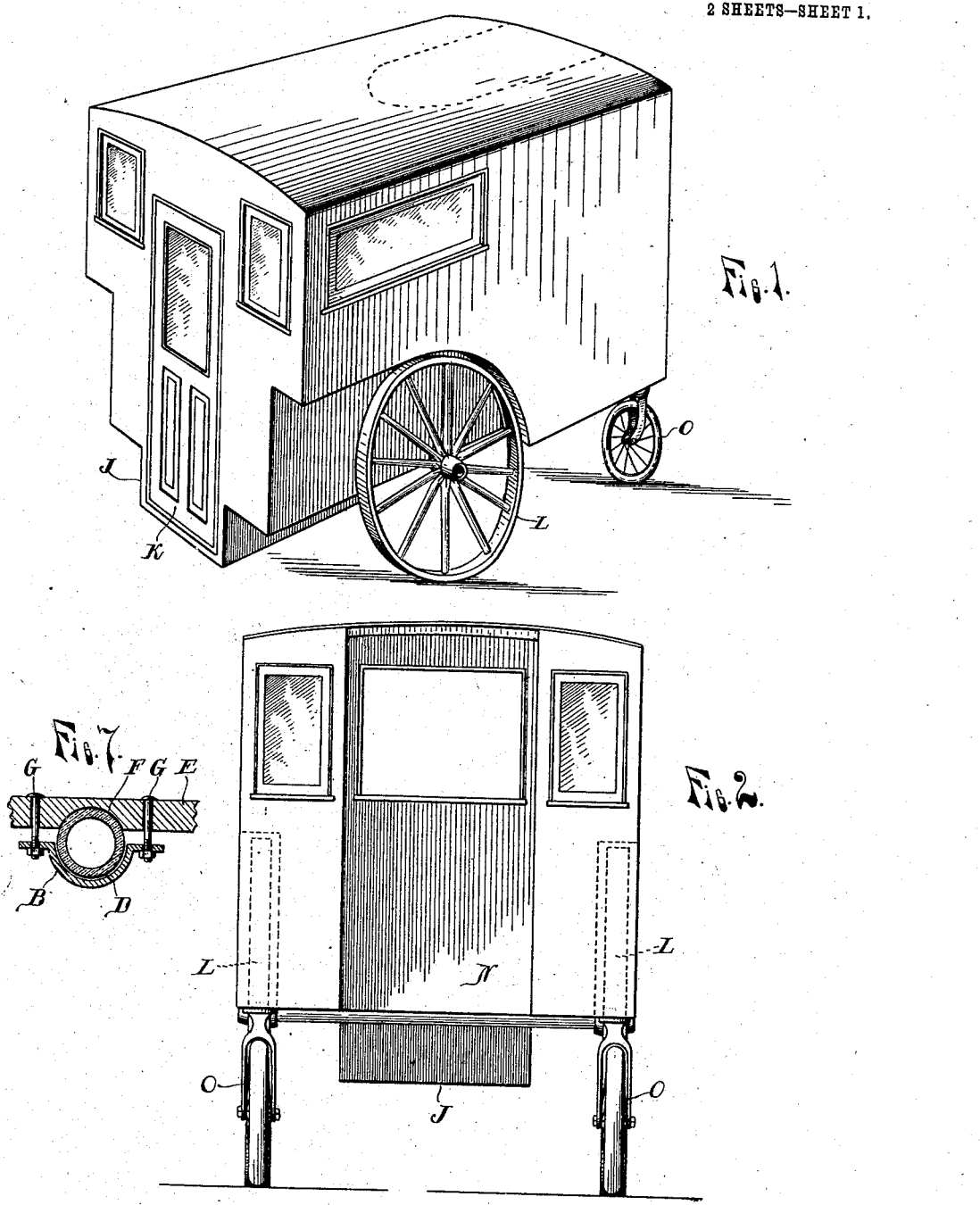

No. 840,146. PATENTED JAN. 1, 1907.
S. D. MADDIN.
VEHICLE.
APPLICATION FILED MAY 10, 1905.
2 SHEETS—SHEET 2.
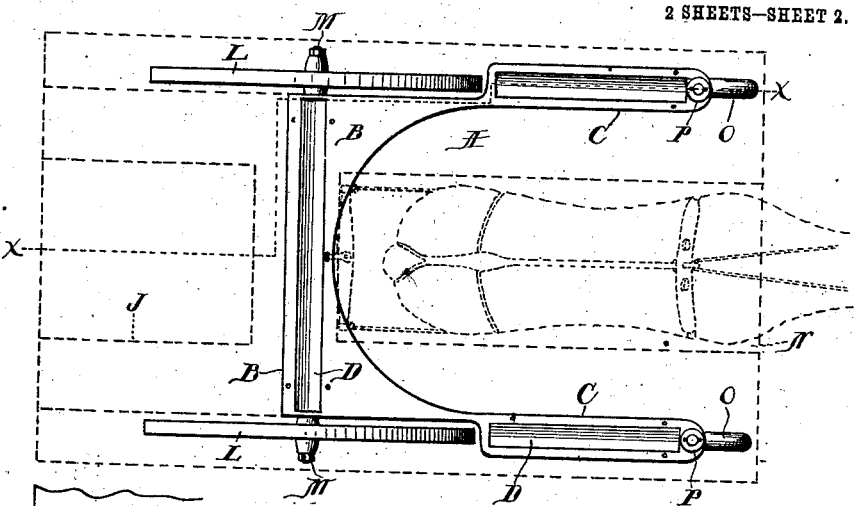
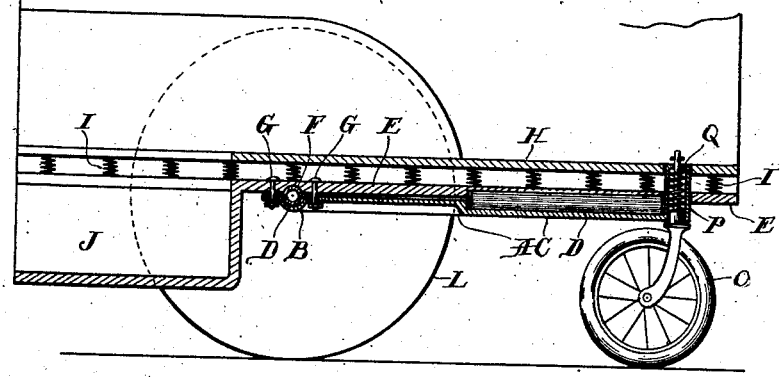
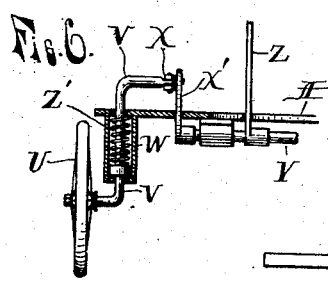
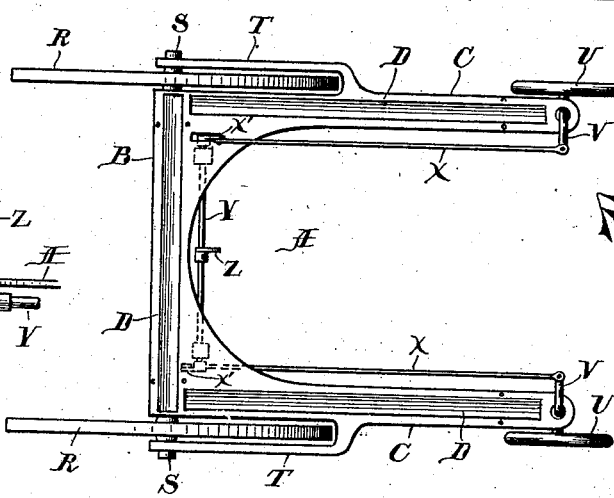
WITNESSES:
Lewis E. Flanders
Joseph A. Noelke
INVENTOR.
Samuel D. Maddin
BY
ATTORNEYS.

UNITED STATES PATENT OFFICE.

SAMUEL D. MADDIN, OF DETROIT, MICHIGAN.

VEHICLE.

No. 840,146.  Specification of Letters Patent.  Patented Jan. 1, 1907.

Application filed May 10, 1905. Serial No. 259,674.

*To all whom it may concern:*

Be it known that I, SAMUEL D. MADDIN, a citizen of the United States of America, residing at Detroit, in the county of Wayne and State of Michigan, have invented certain new and useful Improvements in Vehicles, of which the following is a specification, reference being had therein to the accompanying drawings.

This invention relates to certain new and useful improvements in horse-drawn vehicles and refers more particularly to that class known as "delivery-wagons."

The invention has for its object to combine all the advantages of the four-wheeled wagon with those of the two-wheeled wagon or cart and at the same time eliminate all the disadvantages.

To this end the invention consists in bringing the point of attachment of the horse as near back to the axle as possible to increase the draft and to provide the wagon with front steering or caster wheels and a cushion-frame.

The invention consists, further, in certain other new and useful features, all as more fully hereinafter described, and shown in the accompanying drawings, in which—

Figure 1 is a perspective view of a wagon embodying my invention; Fig. 2, a front elevation; Fig. 3, a plan view of the running-gear; Fig. 4, a vertical section on the line $x\,x$, Fig. 3; Fig. 5, a plan view of a modified construction of running-gear; Fig. 6, a detail of one of the steering-wheels; Fig. 7, an enlarged section showing the pneumatic spring or cushion interposed between the body and the running-gear and the means for connecting the same.

A is the running-gear or underframe, preferably integrally formed from sheet or cast metal and comprising the transverse portion B and forwardly-extending portions C, each provided with a semicircular depression or groove D for the reception of a pneumatic tube adapted to be blown up to any degree of hardness to get the required resiliency, according to the load to be carried.

E is the floor of the wagon-body, preferably provided with similar depressions F for the reception of the upper portion of the tube.

G represents bolts loosely connecting the body and frame, so that the same may be free to have a limited vertical movement in relation to each other.

H is a false bottom, and I represents springs interposed between false bottom and floor to take the jar therefrom.

J is a drop in the floor immediately in rear of the axle for the driver to stand, and K is a door in rear of the body for ready ingress and egress.

L represents the wheels mounted on stub-axles M, preferably integrally formed with the frame, the body being preferably cut away on either side, as shown, for the reception of the wheels.

In order to permit the horse to be attached as near back to the axle as possible, the front of the body is cut away at N, the body extending forward on either side of the horse. The wagon is designed to balance as near as practicable on the hind wheels, and in order to prevent too much weight coming on the horse and to steer the wagon, if desired, the caster-wheels O are provided, journaled in vertical bearings P in the forward end of the frame, a coil-spring Q being interposed to remove the jar.

In Figs. 5 and 6 I have shown a modified construction, the hind wheels R being journaled on removable bolts or stub-axles S in the bifurcated forks T of the frame. Instead of the driver guiding the horse in this construction I have arranged so that the driver can steer the wagon and the horse be made to follow by mounting the front wheels U on steering-knuckles V, pivotally mounted in the vertical bearings W, the free arms of the steering-knuckles being connected by links X with arms X', set opposite on a transverse shaft Y, mounted in bearings on the running-gear. Z is a hand-lever under control of the operator for rocking the shaft to steer the wagon, and Z' represents coil-springs sleeved on the shank of the steering-knuckle to remove the jar from the body.

It will thus be seen that with my construction of wagon the driver standing on the platform J has his goods all around him convenient for delivery and the horse is protected from the weather, as the roof is preferably carried over the horse, suitable windows being provided in the front and sides of the wagon.

If desired, the steering or caster wheels may be placed behind the axle instead of in front, and ordinary elliptic springs may be interposed between the body and the running-gear.

Having thus fully described my invention, what I claim is—

1. In a horse-drawn vehicle, a two-wheeled rigid underframe extending forwardly of the axle and forming sills between which the horse is adapted to be hitched, a wagon-body extending over the underframe forwardly and rearwardly of the axle and upon which the body is substantially balanced, the forward portion of the body being shaped in conformity with the underframe to form a protecting-inclosure for the horse and a pneumatic support for the body interposed between the underframe and body.

2. In a horse-drawn vehicle, a two-wheeled rigid underframe extending forwardly of the axle and forming sills between which the horse is adapted to be hitched, caster-wheels mounted in the forward ends of the frame, a wagon-body extending over the underframe forwardly and rearwardly of the axle, the forward portion of the body being shaped in conformity with the underframe, a yielding support interposed between the underframe and body and draft connection in proximity to the axle.

3. In a vehicle having a two-wheeled rigid underframe extending forwardly of the axle and formed substantially U-shaped in plan, an inclosed wagon-body extending forwardly and rearwardly of the axle over the underframe and yieldingly supported thereon on pneumatic cushions interposed between the frame and body.

4. In a horse-drawn vehicle having a two-wheeled rigid underframe extending forwardly of the axle and formed substantially U-shaped in plan, caster-wheels pivotally mounted in the forward ends of the frame, an inclosed wagon-body extending forwardly and rearwardly of the axle over the underframe and upon which the body is substantially balanced, the forward portion of the body being shaped in conformity with the underframe to form a protecting-housing for the horse in direct draft connection with the axle, said body being yieldingly supported on the underframe and formed with a drop in rear of the axle and means for steering the caster-wheels.

5. A vehicle having a rigid underframe extending forwardly of the axle and constituting with its forward portion the sills between which the animal is hitched, wheels journaled in the forward ends of said portions and an inclosed wagon-body extending over the underframe forwardly and rearwardly of the axle upon which the body is substantially balanced, said body having its forwardly-extending portion inclosed in conformity with the underframe, draft connection in proximity to the axle and means for steering the wheels by the driver.

6. A vehicle having a rigid underframe extending forwardly of the axle and constituting with its forward portion the sills between which the animal is hitched, wheels journaled in the forward ends of said portions and an inclosed wagon-body extending over the underframe forwardly and rearwardly of the axle upon which the body is substantially balanced, said body having its forwardly-extending portion inclosed in conformity with the underframe said body being yieldingly supported on the underframe and formed with a drop in the floor in rear of the axle and means for steering the wheels by the driver.

7. In a horse-drawn vehicle a rigid two-wheeled underframe provided with draft connection within the forward portion of said frame between the side sills of which the horse is adapted to travel and having its forward ends supported upon caster-wheels, an inclosed wagon-body pneumatically supported upon said underframe and having integral forward portions shaped in conformity to the forward portion of the underframe to provide space for the storage of goods within the wagon-body on opposite sides of the horse.

8. In a horse-drawn vehicle, a rigid two-wheeled underframe, forming with its forward portion a U-shaped frame within which the horse is adapted to be hitched for drawing the vehicle and the forward ends of which are supported upon caster-wheels, an inclosed vehicle-body extending over the forward end of the underframe and shaped in conformity therewith to form an inclosing housing over the underframe, said body being independent of the underframe and yieldingly supported thereon in a substantially balanced condition and lever connections for steering the caster-wheels by the driver.

In testimony whereof I affix my signature in presence of two witnesses.

SAMUEL D. MADDIN.

Witnesses:
OTTO F. BARTHEL,
JOSEPH A. NOELKE.